UNITED STATES PATENT OFFICE.

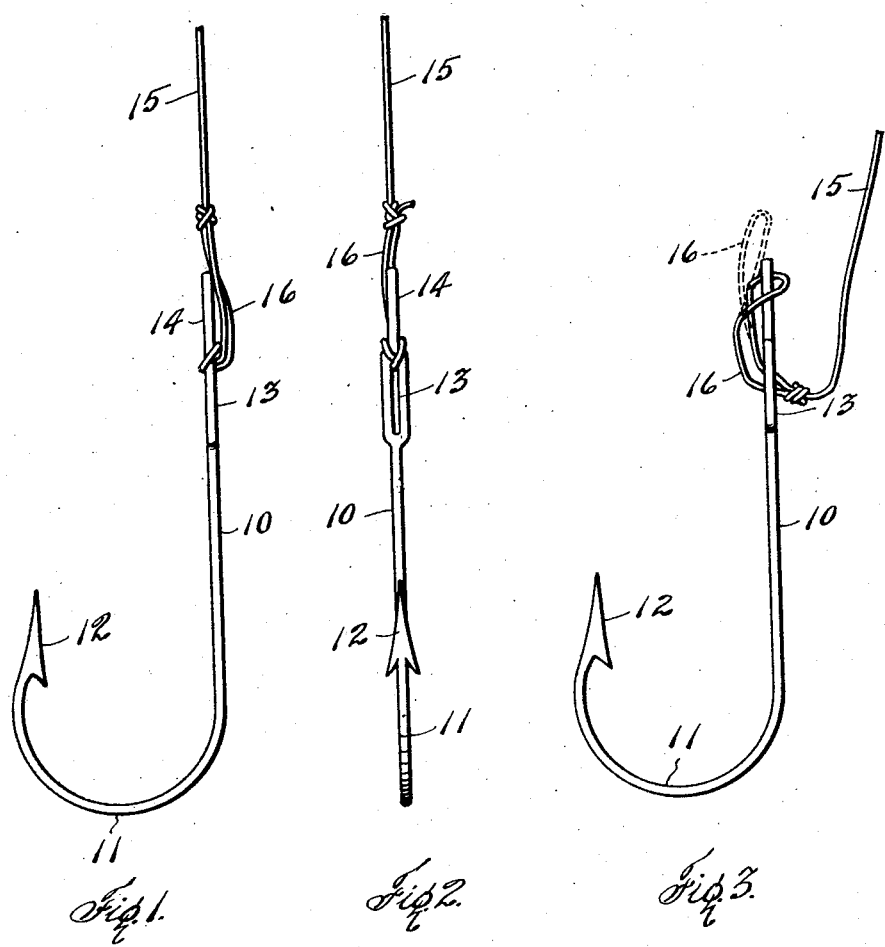

GRANT BURNS, OF DALLAS TEXAS.

FISHHOOK.

Application filed February 9, 1926. Serial No. 86,998.

This invention relates to new and useful improvements in fish hooks.

The object of the invention is to provide a fish hook which may be attached to or detached from the line without the tying or untying of a knot.

A further object of the invention is to provide a fish hook, whereby a loop on the end of the line may be readily attached or disconnected in an easy and expeditious manner; also whereby the line may be easily disconnected from a hook caught in the mouth of a fish and the hook pushed through the gills or otherwise.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a hook constructed in accordance with my invention and attached to a fishing line, Fig. 2 is a front elevation of the same, and Fig. 3 is a view similar to Fig. 1 showing the line partially attached.

In the drawings the numeral 10 designates the shank of a fish-hook having a bill 11 and a barb 12 of the usual construction or any other construction. The shank 10 is formed at its upper end with an elongated eye 13 from the upper end of which a tongue 14 extends upwardly. The tongue and shank are preferably axially alined.

The eye 13 may be readily formed by upsetting the shank or by brazing the eye into the shank or otherwise. The eye should be of such size and thickness as not to weaken the hook.

For attaching the hook to the fishing line 15 the latter is formed with a loop 16 at its lower end. The free end of this loop is threaded through the eye and the loop pulled through said eye, a sufficient distance, to permit the said free end to be engaged over the upper end of the tongue 14, as is shown in Fig. 3. When this has been done a pull on the line 15, while the hook is held stationary, will draw the end of the loop down the tongue and the doubled portion of said loop up the eye to the fastened position shown in Figs. 1 and 2.

It will be seen that there is no chance of the loop becoming detached from the hook so long as the line is hanging in the water or is taut. The hook is readily detached by pushing the loop through the eye to loosen it, then lifting the end from the tongue to the position shown in dotted lines in Fig. 3, and pulling on the line to draw the loop from the eye. Thus the hook may be easily removed when putting away the line or for any other purpose. If the hook should be caught in the mouth of a fish, the line may be easily detached and the hook removed by pushing it out through the gills of the fish or otherwise.

Various changes in the size and shape of the different parts, as well as modifications and alterations, may be made within the scope of the appended claims.

What I claim is:

1. A fish hook having an elongated eye at the upper end of its shank and a tongue extended therefrom axially of the eye and of substantially the same length.

2. The combination with a fishing line having a free-end loop, of a hook having its shank formed with an opening intermediate its ends for receiving said loop and an elongated portion extending from said opening for gripping engagement of the free end of the loop with the base of said portion.

In testimony whereof I affix my signature.

GRANT BURNS.